Nov. 16, 1926.
J. L. HECHT
1,607,274

MEANS FOR ATTACHING PARTS OR MEMBERS TOGETHER

Filed Oct. 10, 1924  2 Sheets-Sheet 1

Inventor
J. L. Hecht
by
Rogers, Kennedy Campbell
Attys

Nov. 16, 1926.　　　　　　　　　　　　　　1,607,274
J. L. HECHT
MEANS FOR ATTACHING PARTS OR MEMBERS TOGETHER
Filed Oct. 10, 1924　　　　2 Sheets-Sheet 2

Inventor
J. L. Hecht
by Rogers, Kennedy, Campbell
Attys

Patented Nov. 16, 1926.

1,607,274

UNITED STATES PATENT OFFICE.

JOSEPH L. HECHT, OF DAVENPORT, IOWA, ASSIGNOR TO THE FIRM OF FRENCH & HECHT, COMPOSED OF G. WATSON FRENCH, JOSEPH L. HECHT, AND W. H. STACKHOUSE, OF DAVENPORT, IOWA.

MEANS FOR ATTACHING PARTS OR MEMBERS TOGETHER.

Application filed October 10, 1924. Serial No. 742,739.

This invention relates to means for the firm and secure attachment of parts or members to each other, and has reference more particularly to the attachment of such parts when one is provided with a projecting stud and the other is formed with a hole to receive the stud and is to be clamped firmly on the stud and against the part carrying the stud. In the assembly and connection of such parts, a tight or "drive" fit on the stud is often required, and consequently very accurate workmanship is necessary in the formation of the studs and holes; and where, as is frequently the case, the part or member to be fastened is to be fitted to a plurality of bolts or studs, as for instance in attaching the outer wheel member of a dual motor wheel to the inner wheel member, not only is accurate workmanship required in connection with the individual studs and holes in order to bring about a drive fit, but accuracy is necessary also in respect to the relative location of the holes and studs to enable the parts to be assembled with the holes in exact registry with the studs.

It has been proposed to obviate the necessity for such accurate and exact workmanship under the conditions mentioned, and enable the parts to be quickly assembled and firmly secured together although they may not fit with accuracy, by giving a taper to the hole in the part to be secured and seating an externally tapered contractible sleeve around the stud within the hole, which being forced into the hole by a nut screwed on the stud and interlocked with the contractible member, will force the part to be secured into firm engagement with the other part, while at the same time contracting tightly on the stud. A device of this character is disclosed and claimed in an application filed by me on the 21st day of December, 1923, Serial No. 681,909.

The present invention is an improvement on this device in respect to the specific form of the contractible member, which in accordance with the present invention is constructed of a plurality of separate complementary sections movable relatively to each other in order to give the device greater flexibility, and to enable the contractible member to better accommodate itself to the surfaces with which it engages, so as to bring about a more solid seating of the parts and a better attachment of the same.

The invention contemplates also means for maintaining the separate sections of the contractible member interlocked with the nut so that escape of the sections from the nut will be prevented when the latter is unscrewed from the stud in withdrawing the contractible member from the hole in disassembling the parts.

The invention consists also in the details of construction and combination of parts hereinafter described and claimed.

Figure 1:
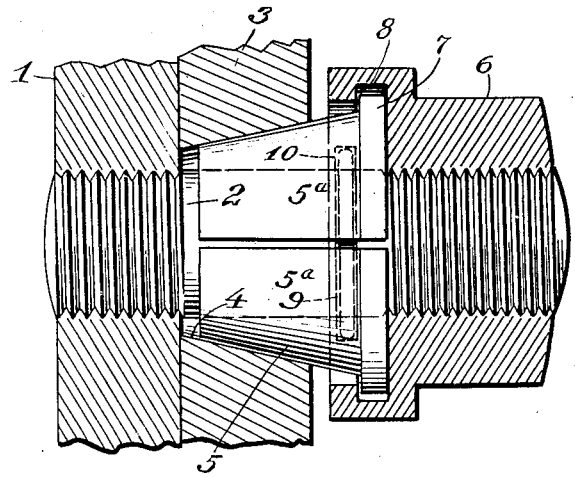
Fig. 1 is a sectional elevation of two parts or members involving a single supporting stud or bolt, connected together by means embodying my invention.
Figure 2:
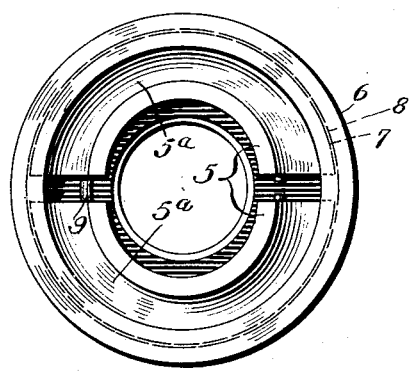
Fig. 2 is an end view of the contractible member and its attached operating nut.
Figure 3:
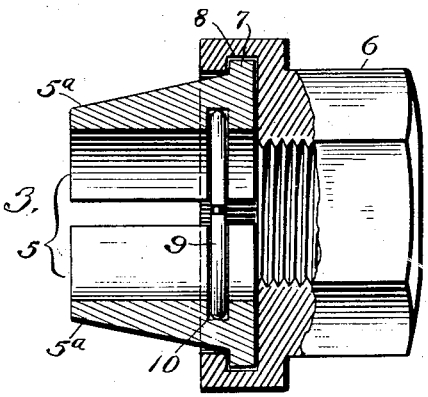
Fig. 3 is a longitudinal section through the same.

Referring to the drawings:

Referring to Figs. 1, 2 and 3, 1 designates a supporting member, in this instance in the form of a plate, and 2 designates a supporting stud fixed to and projecting from the plate and threaded at its outer end. 3 designates a second member, in this instance a plate which is to be firmly clamped to the member 1. The plate 3 is formed with a circular tapered hole 4 and is assembled flatwise against the supporting plate with the hole surrounding the stud and leaving a substantial annular clearance around the stud. 5 designates a sleeve-like contractible member of externally tapered form to cooperate with the walls of the sloping hole, which member surrounds the stud within the hole; and 6 designates a nut screwed on the stud and adapted when screwed up to force the contractible member into the hole, in which action the sloping external surface of the contractible member cooperating with the walls of the tapered hole, will force the member 3 into firm engagement with the supporting member, while at the same time the contractible member will be contracted on the stud and the parts will be clamped together in firm and solid engagement with each other. The foregoing parts and their method of operation are fully described in the application above referred to.

The present invention is directed to the specific form of the contractible member, which in accordance with the invention is composed of a plurality of (in the present instance two) complementary segmental sections $5^a$, $5^a$ which are interlocked with the nut 6 in such manner that while capable of movement relative to each other, they will be moved bodily into and out of the hole when the nut is screwed on the stud. To effect this object, the two segmental sections are in the present instance provided at their outer ends with outwardly projecting shoulders 7 which seat in an internal groove 8 formed in the interior of the nut, the shoulders being maintained in the groove and the sections prevented from escape from the nut, in this instance by means of a split expansion spring ring 9 seated in grooves 10 in the interior of the segmental sections. The spring ring acts to spread the segmental sections apart and maintains them yieldingly separated from each other with the ribs confined in the groove in the nut, thereby permitting the sections to move relatively to and from each other and their contraction on the stud when the contractible member is forced into the hole, and also preventing the escape of the sections from the nut when the latter is unscrewed from the stud in disassembling the parts. The construction adds to the flexibility of the contractible member, and better enables the same to readily accommodate itself to the walls of the tapered hole and to effect a solid seating of the parts in bringing about their firm attachment to each other.

In the use and operation of the parts described, the plate 3 is seated against the supporting plate 1, with the stud extending through the hole in plate 3, and the contractible member is passed over the stud and entered in the hole, and the nut is screwed on the stud. When the nut is screwed up, the contractible member will be forced into engagement with the walls of the hole, and by the cooperation of the sloping surfaces of the parts, the contractible member will be contracted on and will tightly embrace the stud and will be wedged tightly in the hole and will force the plate 3 into firm engagement with the supporting plate 1, and all lost motion and play between the parts will be taken up. Due to the interlocking connection of the nut with the sections of the contractible member as shown, the rotation of the nut in screwing or unscrewing the same, will positively move the contractible member along the stud, thereby enabling it to be positively withdrawn from the hole when the nut is unscrewed in disassembling the parts.

From the foregoing description of the construction and operation, it will be understood that a fit of the plate 3 on the stud 2 may be secured answering all of the purposes and advantages of a "drive" fit, but without the necessity of accurately forming the parts for such fit, the contractible member when forced to a greater or less extent into the hole, according to the amount of clearance, acting to wedge in the hole and contract on the stud and thereby drawing the parts into firm and tight engagement with each other.

From the drawings it will be seen that the portion of the stud within the tapered hole in the part 3, surrounded by the contractible member, is unthreaded and smooth, so that when said member is contracted by being forced into the tapered hole, it will close on and embrace the smooth portion of the stud and thereby be enabled to take a firm grip, which will hold the parts firmly in their relatively fixed clamped relations.

Figure 4:
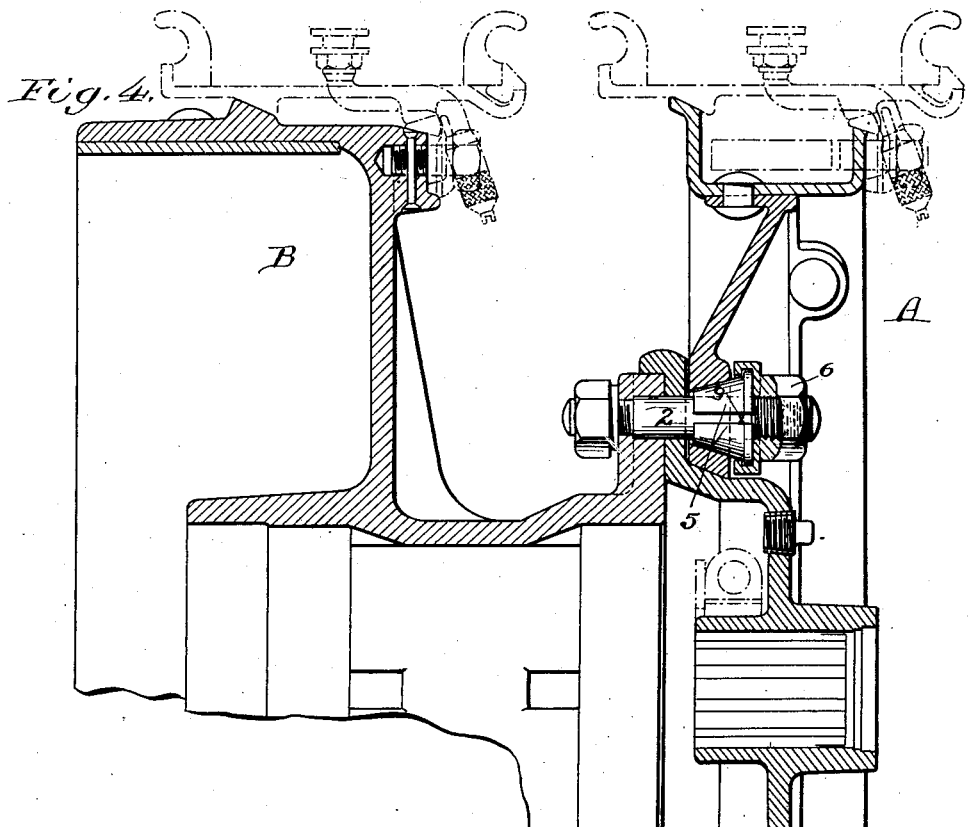
Fig. 4 is a sectional elevation of a dual wheel showing the two wheel members connected together by my improved devices.
Figure 5:
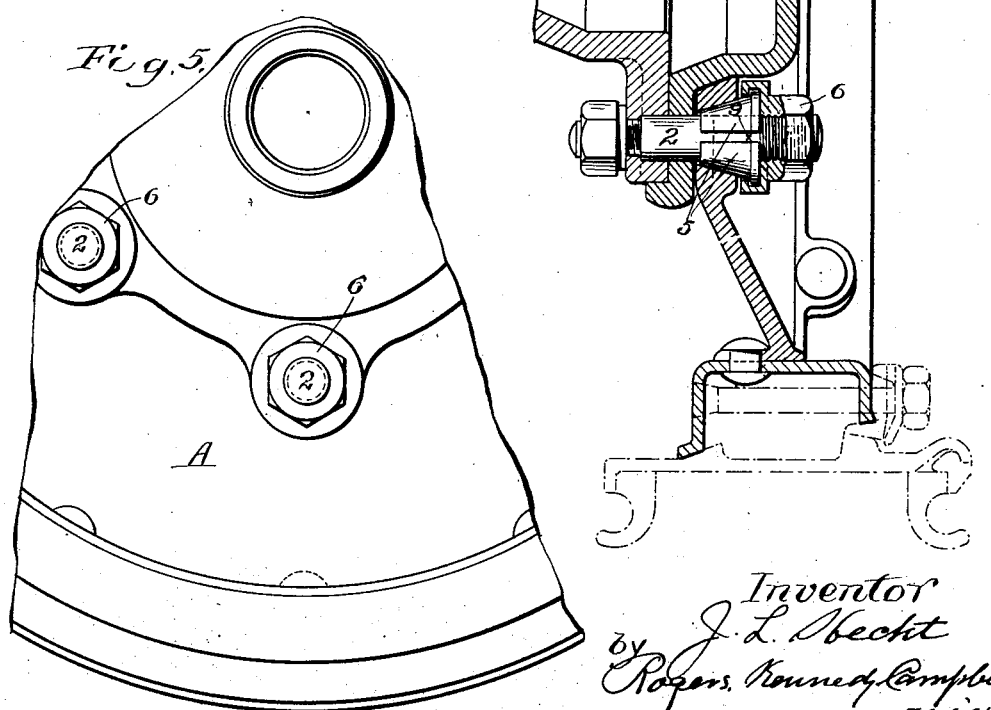
Fig. 5 is a front elevation of the same.

While in the case above described involving a single supporting stud, the invention possesses many valuable advantages, further advantages are obtained in cases where the part to be attached is applied to a number of studs as is frequently required. An example of such use is illustrated in Figs. 4 and 5 showing the invention applied in connection with a dual wheel to detachably fasten the outer wheel A to the inner wheel B, and enable the outer wheel to be readily removed from the inner wheel when for instance it is desired to remove or replace the tire of the inner wheel. Here it will be seen that the inner wheel has fixed to it a number of axially extending studs 2 arranged at intervals around the same, and the outer wheel is formed with a corresponding number of tapered holes which seat over the studs, and there is applied to each stud a contractible member 5 and its connected actuating nut 6, and the latter being screwed up on the studs, the contractible members will be forced into the holes and will wedge therein thereby forcing the outer wheel into firm engagement with the inner wheel and holding the same by the contraction of the contractible member on the studs. In the use of my invention in connection with a construction of this character involving a plurality of supporting studs, it is evident that extreme accuracy in the positioning of the holes and studs is not required, since the contractible members will compensate for differences arising by reason of the non-registration of the parts, and the holes in the outer wheel member may be of a size to leave substantial clearance between them and the studs, thereby enabling the outer wheel to be readily assembled on the studs without the necessity of bringing the parts into definite exact relative positions, and enabling the outer wheel to be freely removed from the inner wheel when the contractible members are withdrawn from the holes. By reason therefore of this construction the outer wheel may be attached and removed from the inner wheel with the greatest facility and ease, and yet a firm and solid seating of the parts may be brought about and their rigid and secure attachment effected.

While in the foregoing description and accompanying drawings I have shown the invention in the particular detailed form which I prefer to adopt, it will be manifest that these details may be variously changed and modified without departing from the spirit of the invention; and it will be further understood that the invention is not limited to any particular form or construction of the parts except in so far as such limitations are specified in the claims.

Having thus described my invention, what I claim is:

1. In combination with a supporting member, a stud fixed to and projecting therefrom and provided on its outer extremity with external screw threads, a clamped member seated against said supporting member and formed with a tapered hole surrounding the stud, an externally tapered contractible member surrounding the stud within the tapered hole and comprising a plurality of complementary segmental sections terminating at their outer ends inward of the outer end of the stud, and an internally threaded nut screwed on the outer externally threaded end of the stud and disposed wholly outward of the clamped member, said nut being interlocked with the outer ends of the sections of the contractible member.

2. In combination with a supporting member, a stud fixed to and projecting therefrom and provided on its outer extremity with external screw threads, a clamped member seated against said supporting member and formed with a tapered hole surrounding the stud, an externally tapered contractible member surrounding the stud within the hole and comprising a plurality of complementary segmental sections each formed at its outer end with an outwardly projecting shoulder, an internally threaded nut screwed on the outer externally threaded end of the stud and disposed wholly outward of the clamped member, said nut being formed with an internal annular groove in which the shoulders on the segmental sections are seated, and an expansion spring engaging the interior of said segmental sections and acting to spread the sections outwardly so as to maintain engagement of their shoulders in the groove in the nut.

3. In combination with a supporting member, a stud fixed to and projecting therefrom and provided on its outer extremity with external screw threads, the external surface of the stud axially inward of said screw threads being unthreaded and smooth, a clamped member seated against said supporting member and formed with a tapered hole surrounding the unthreaded portion of the stud, an externally tapered contractible member surrounding the stud within the tapered hole and comprising a plurality of complementary segmental sections terminating at their outer ends inward of the outer end of the stud, and an internally threaded nut screwed on the outer externally threaded end of the stud and disposed wholly outward of the face of the clamped member, said nut being interlocked with the outer ends of the sections of the contractible member.

4. In combination with a supporting member, a plurality of studs fixed to and projecting therefrom at intervals and provided at their outer extremities with external screw threads, a clamped member seated against the supporting member and provided with tapered holes surrounding the respective studs, an externally tapered contractible member surrounding each stud within its hole, said contractible members comprising each a plurality of complementary segmental sections terminating at their outer ends inward of the outer ends of the studs, and internally threaded nuts screwed on the outer externally threaded ends of the respective studs and disposed wholly outward of the face of the clamped member, said nuts being interlocked with the outer ends of the sections of the contractible members.

In testimony whereof, I have affixed my signature hereto.

JOSEPH L. HECHT.